United States Patent [19]

Meroni

[11] 4,350,948
[45] Sep. 21, 1982

[54] VOLTAGE-STEP-DOWN CIRCUIT WITH CHOPPING TRANSISTOR FOR D-C POWER SUPPLY

[75] Inventor: Umberto Meroni, Novate Milanese, Italy

[73] Assignee: Societa Italiana Telecomunicazioni Stemens S.p.A., Milan, Italy

[21] Appl. No.: 131,705

[22] Filed: Mar. 19, 1980

[30] Foreign Application Priority Data

Mar. 20, 1979 [IT] Italy ............................. 21130 A/79

[51] Int. Cl.³ ............................................. G05F 1/56
[52] U.S. Cl. ..................................... 323/282; 323/290
[58] Field of Search ................... 323/17, DIG. 1, 282, 323/288, 289, 351

[56] References Cited

U.S. PATENT DOCUMENTS

| | | | |
|---|---|---|---|
| 3,781,653 | 12/1973 | Marini | 323/DIG. 1 |
| 3,805,094 | 4/1974 | Orlando | 323/289 |
| 3,818,318 | 6/1974 | Schott et al. | 323/DIG. 1 |
| 4,030,024 | 6/1977 | Chambers et al. | 332/17 |

FOREIGN PATENT DOCUMENTS

| | | | |
|---|---|---|---|
| 1938954 | 6/1970 | Fed. Rep. of Germany | 323/282 |
| 259970 | 5/1970 | U.S.S.R. | 323/288 |

*Primary Examiner*—William H. Beha, Jr.
*Attorney, Agent, or Firm*—Karl F. Ross

[57] ABSTRACT

A circuit for reducing the voltage of a d-c power supply with one grounded terminal comprises a chopping transistor in an ungrounded supply lead, periodically turned on and off by an electronic switch, and an L/C network downstream of that transistor along with a flywheel diode. The switch lies in series with an ancillary voltage generator, having a terminal voltage substantially lower than the supply voltage, in a grounded loop which is reactively coupled to the transistor base via a capacitor or a transformer. A control signal for opening and closing the switch may be obtained from a square-wave generator connected across the transistor output and driven by the stepped-down supply voltage.

4 Claims, 3 Drawing Figures

VOLTAGE-STEP-DOWN CIRCUIT WITH CHOPPING TRANSISTOR FOR D-C POWER SUPPLY

FIELD OF THE INVENTION

My present invention relates to a step-down circuit for the reduction of the voltage of a direct-current supply serving for the energization of one or more loads.

BACKGROUND OF THE INVENTION

A known step-down circuit of this type, described in commonly owned Italian Pat. No. 926,652 issued Aug. 17, 1972, comprises essentially a chopping transistor in series with a conductor connected to an ungrounded supply terminal and a smoothing filter downstream of that transistor. An ancillary direct-current source, in series with an intermittently closed electronic control switch, is inserted between the transistor base and the other supply terminal, i.e. ground. Periodic closure of the control switch briefly saturates the transistor and charges a shunt capacitor forming part of the downstream filter. The load voltage, developed across that capacitor, is therefore a fraction of the supply voltage determined by the open/closed ratio of the control switch.

Such a control circuit operates generally satisfactorily, especially with relatively low supply voltages of not more than about 100 V. With substantially higher voltages, however, the power dissipated by the circuit branch including the ancillary d-c source becomes significant.

OBJECT OF THE INVENTION

The object of my present invention, therefore, is to provide an improved voltage-step-down circuit of the aforedescribed type in which only negligible power is dissipated, even with high supply voltages, by the ancillary circuit components controlling saturation and cutoff of the series transistor.

SUMMARY OF THE INVENTION

I realize this object, in accordance with my present invention, by inserting the electronic switch together with the ancillary d-c source, whose voltage is substantially lower than that of the supply, in a control loop galvanically separated (except through the supply itself and the load or loads) from the conductor containing the chopping transistor. A central electrode of that transistor, e.g. a base, is coupled to the control loop by reactance means such as a capacitor or a transformer for alternately turning the transistor on and off in the rhythm of a pulsating current traversing the control loop.

The electronic switch may be operated by a pulse generator connected across the supply conductors (one of which may be ground) downstream of the series transistor for energization by the stepped-down supply voltage.

BRIEF DESCRIPTION OF THE DRAWING

The above and other features of my invention will now be described in detail with reference to the accompanying drawing in which.

SPECIFIC DESCRIPTION

Figure 1:
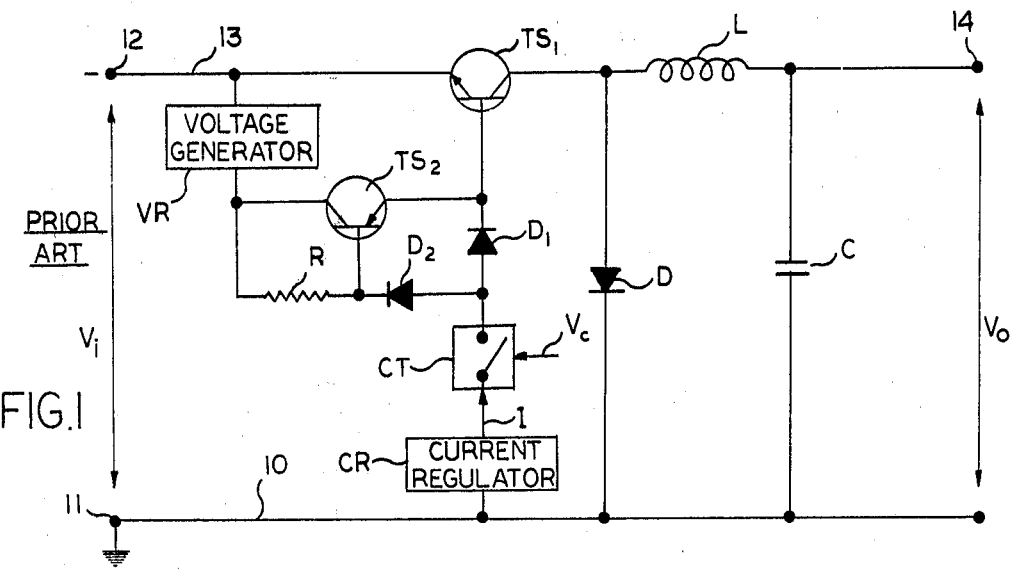
FIG. 1 is a diagram of a prior-art step-down circuit as disclosed in the above-identified Italian patent (see also the corresponding U.S. Pat. No. 3,781,653)

The conventional voltage-step-down circuit of FIG. 1 comprises a d-c supply, represented by a grounded terminal 11 and an ungrounded terminal 12 of negative polarity, producing an input voltage $V_i$ across a two-conductor line represented by a grounded lead 10 and an ungrounded lead 13. An NPN chopping transistor $TS_1$ has its collector and emitter inserted in conductor 13, the emitter facing input terminal 12 while the collector faces an output terminal 14. An inductance L, lying between transistor $TS_1$ and terminal 14, forms part of a smoothing filter further comprising a shunt capacitor C connected across conductors 10 and 13. The filter also includes a so-called flyback diode D which, upon termination of conduction of the transistor, allows continued negative charging of the ungrounded capacitor plate via the e.m.f. stored in inductance L. The base of transistor $TS_1$ is connected to ground through a shunt branch including a current regulator or source CR, an electronic switch CT and a diode $D_1$ in series. Switch CT is periodically opened and closed by a control voltage $V_c$ from a trigger-pulse generator not shown in this Figure. An output voltage $V_o$, substantially lower than input voltage $V_i$, is thus developed across capacitor C for the energization of a nonillustrated load connected between terminal 14 and ground lead 10.

FIG. 1 also shows additional circuit elements designed to insure a sharp cutoff of chopping transistor $TS_1$ when switch CT is opened, these elements including an ancillary PNP transistor $TS_2$ connected in series with a voltage generator VR between the emitter and the base of transistor $TS_1$. The base of transistor $TS_2$ is biased by a resistor R, inserted between its collector and its base, and a diode $D_2$ lying between that base and switch CT.

Upon closure of switch CT, current from regulator CR flows in the forward direction through diodes $D_1$ and $D_2$ to the bases of transistors $TS_1$ and $TS_2$, respectively, thereby saturating the former and cutting off the latter. Included in the current path, between ground and input terminal 12, are the biasing resistor R and the voltage generator VR. When the switch opens, negative potential from voltage generator VR reaches the base of transitor $TS_2$ and, with that transistor now saturated, is also fed to the base of transistor $TS_1$ to terminate its conduction by an accelerated sweep-out of minority carriers. If the current I issuing from regulator CR has a magnitude of 50 mA and the supply voltage $V_i$ equals 150 V, the power dissipated in that shunt branch equals $V_i.I=150.50.10^{-3}=7.5$ W during closure of switch CT. With a 50% duty ratio, the actual dissipation amounts to 3.75 W.

Figure 2:
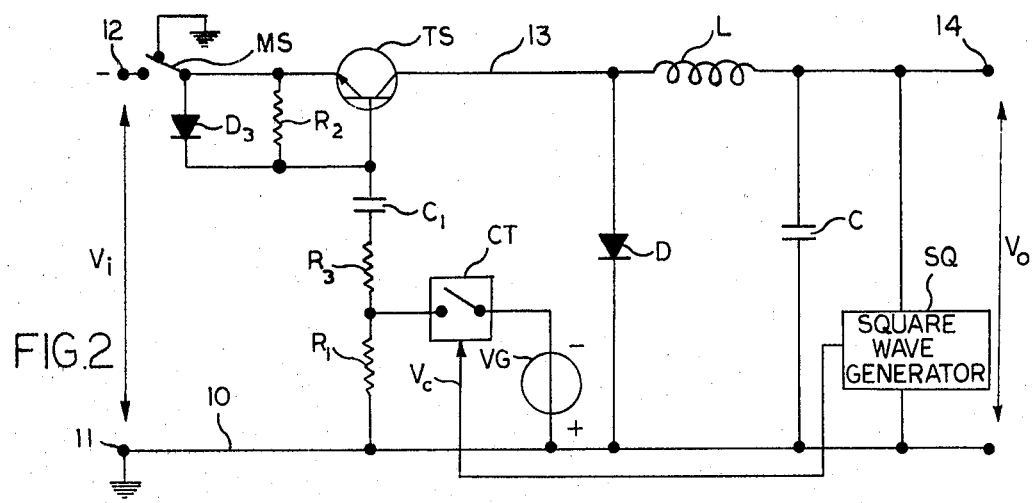
FIG. 2 is a diagram similar to FIG. 1 but illustrating one embodiment of my present invention.

In FIG. 2 I have shown a step-down circuit with only a single chopping transistor TS, similar to transistor $TS_1$ of FIG. 1, inserted in the live conductor 13 with its emitter again facing the supply terminal 12. This circuit also includes the filter reactances L and C as well as the flyback diode D already described. An ancillary voltage generator VG, whose output voltage is a small fraction of the supply voltage $V_i$, has its positive terminal grounded and forms part of a control loop also including the switch CT and a resistor $R_1$ in series therewith. The junction between switch CT and the resistor $R_1$ is connected, through another resistor $R_3$ forming a voltage divider therewith, to one plate of a coupling capacitor $C_1$ whose other plate is tied to the base of transistor TS and which thus galvanically separates the control loop from the transistor base. The emitter and base of this transistor are interconnected through a protective diode $D_3$ and a resistor $R_2$ in parallel therewith.

FIG. 2 also shows a square-wave generator SQ with inputs connected across conductors 10 and 13 for energization by the stepped-down load voltage $V_o$. This generator, therefore, consumes energly only when the step-down circuit is operative, i.e. upon closure of a master switch MS in series with the supply of voltage $V_i$. Upon initial activation of the circuit, i.e. with reversal of master switch MS through which capacitor $C_1$ was previously grounded, the emitter of transistor TS is driven negative with reference to its base so that transistor TS conducts and energizes the square-wave generator SQ together with any load in parallel therewith. Transistor TS remains saturated for a period determined mainly by the time constant of the circuit branch constituted by capacitor $C_1$ and resistors $R_1$, $R_2$ and $R_3$; to a minor extent, the desaturation of the trnsistor is accelerated by the flow of base current. The circuit parameters should, of course, be selected so as to cause the filter capacitor C to acquire a sufficient charge for continued energization of generator SQ after the transistor has been cut off. Upon the next closure of switch CT by a trigger pulse $V_c$ from generator SQ, a negative potential applied by voltage generator VG to the junction of resistors $R_1$ and $R_3$ reduces the voltage difference across coupling capacitor $C_1$ whereby the base of transistor TS is again biased positive with reference to its emitter to resaturate the transistor upon the subsequent reopening of control switch CT. From that point on, therefore, the system operates essentially in the manner of the conventional circuit shown in FIG. 1, except that the flow of pulsating current is confined to the loop constituted by voltage generator VG, switch CT and resistor $R_1$. Aside from the brief activation period described above, therefore, collateral dissipation is determined by the voltage of ancillary generator VG which may be less than one-tenth of the supply voltage $V_i$, e.g. 12 V. If a current flow of 50 mA is again assumed during closure of switch CT, the dissipated power will be $12.50.10^{-3}=0.6$ W during switch closures and half that amount, i.e. 0.3 W, over an entire operating cycle with a 50% duty ratio. This represents less than 10% of the dissipation calculated for the circuit of FIG. 1.

Diode $D_3$ protects the transistor TS from reverse charges of coupling capacitor $C_1$ while resistor $R_3$ has a similar protective function for the semiconductor (generally also a transistor) constituting the electronic switch CT.

Figure 3:
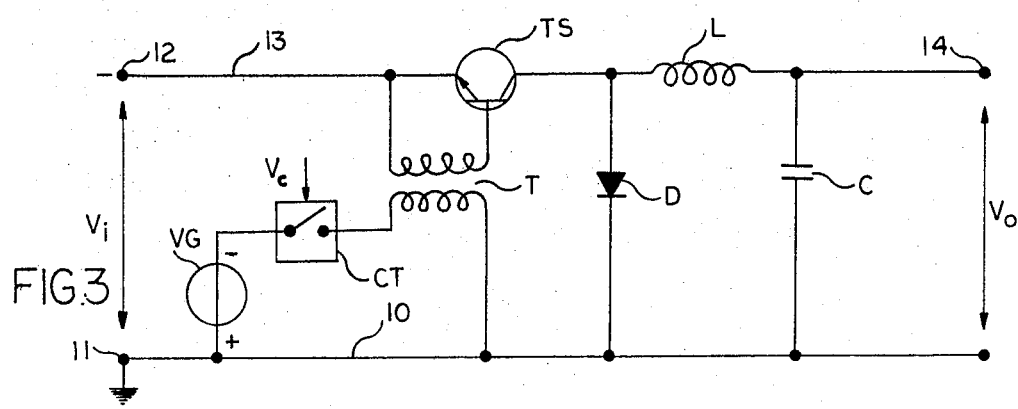
FIG. 3 is a diagram again similar to that of FIG. 1 but representing a different circuit for the same purpose.

The modified step-down circuit of FIG. 3 comprises the same components TS, L, C, D, CT and VG as that of FIG. 2, with replacement of resistor $R_1$ in the control loop by the primary winding of a coupling transformer T whose secondary winding is connected across the base and emitter of transistor TS. In this instance the polarity of ancillary voltage generator VG is immaterial; in fact, the control loop need not be grounded as in the embodiment of FIG. 2. If transistor TS is designed to conduct when its emitter and base are at the same potential, the source of control pulses $V_c$ (not shown in FIG. 3) may again be connected across leads 10 and 13 downstream of filter L, C.

In FIG. 3, again, the pulsating current determining the saturation and cutoff of transistor TS is confined to the control loop and does not draw upon the supply voltage $V_i$. Thus, the circuit of FIG. 3 operates with low collateral power dissipation comparable to that of the circuit of FIG. 2.

I claim:

1. A step-down circuit for deriving a reduced output voltage from the voltage of a d-c supply connected across a pair of conductors, comprising:

a chopping transistor connected in series with one of said conductors between an input end and an output end thereof, said transistor being provided with a control electrode;

voltage-smoothing filter means including a shunt capacitance connected across said conductors downstream of said transistor;

a control loop including in series an electronic switch, a first resistor and an ancillary source of d-c voltage substantially lower than the supply voltage, said first resistor being part of a voltage divider also including a second resistor, said first resistor being inserted between said control electrode and the other of said conductors while being galvanically separated from said control electrode by said second resistor and by a coupling capacitor interposed between said voltage divider and said control electrode, said second resistor lying outside said loop; and pulse-generating means connected to said electronic switch for alternately opening and closing same in a predetermined rhythm whereby said series resistor is traversed by a pulsating current rendering said resistor intermittently conductive.

2. A step-down circuit as defined in claim 1 wherein said control electrode is a base, said transistor further having an emitter connected to said input end and a collector connected to said output end of said one of said conductors, further comprising a third resistor connected across said emitter and base.

3. A step-down circuit as defined in claim 2, further comprising a protective diode connected across said third resistor.

4. A step-down circuit as defined in claim 1, 2 or 3 wherein said pulse-generating means is connected across said conductors downstream of said transistor for energization by the reduced output voltage.

* * * * *